(12) United States Patent
Wilke et al.

(10) Patent No.: US 11,125,714 B2
(45) Date of Patent: Sep. 21, 2021

(54) POTENTIOMETRIC SENSOR

(71) Applicant: Endress + Hauser Conducta Gesellschaft für Mess-und Regeltechnik mbH + Co. KG, Gerlingen (DE)

(72) Inventors: Stefan Wilke, Halle (DE); Jens Vettermann, Grossweitzschen (DE); Jens Voigtlander, Waldheim (DE); Magdalena Losik, Dresden (DE); Michael Hanko, Dresden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 1186 days.

(21) Appl. No.: 15/007,827

(22) Filed: Jan. 27, 2016

(65) Prior Publication Data

US 2016/0216230 A1   Jul. 28, 2016

(30) Foreign Application Priority Data

Jan. 28, 2015 (DE) ............... 10 2015 101 191.3

(51) Int. Cl.
*G01N 27/333* (2006.01)

(52) U.S. Cl.
CPC ................. *G01N 27/333* (2013.01)

(58) Field of Classification Search
CPC ............ G01N 27/333; G01N 27/36; G01N 27/403–404; G01N 27/414–27/4168; G01N 27/30–4035
See application file for complete search history.

(56) References Cited

U.S. PATENT DOCUMENTS 3,219,556 A * 11/1965 Arthur ............ G01N 27/333
                                                        204/252
3,598,713 A * 8/1971 Baum ............. G01N 27/3335
                                                        204/417

(Continued)

FOREIGN PATENT DOCUMENTS

CN          1846132 A     10/2006
CN       102313767 A      1/2012

(Continued)

OTHER PUBLICATIONS

Ceresa et al. (A. Ceresa, T. Sokalski, E. Pretsch, Influence of key parameters on the lower detection limit and response function of solvent polymeric membrane ion-selective electrodes, J. Electroanalytical Chemistry, 501 (2001) 70-76 (Year: 2001).*

(Continued)

*Primary Examiner* — Joshua L Allen
(74) *Attorney, Agent, or Firm* — Christopher R. Powers; Endress+Hauser (USA) Holding Inc.

(57) ABSTRACT

A potentiometric sensor having a measuring half cell with a conductor element, a reference half cell with a reference element, a measuring circuit connected with the conductor element of the measuring half cell and the reference element of the reference half cell and designed to create a measuring signal that is dependent on a potential difference between the conductor element and the reference element. The measuring half cell further includes a housing having a housing chamber closed off by a first ion-selective membrane and contacted by the conductor element, a first inner electrolyte contained within the housing chamber and contacting the ion-selective membrane. The conductor element includes an inner conductor, especially an inner conductor comprising a metallic conductor, connected with the measuring circuit (Continued)

and a gas-tight barrier separating the inner conductor from the first inner electrolyte.

16 Claims, 3 Drawing Sheets

(56) References Cited

U.S. PATENT DOCUMENTS

| | | | | |
|---|---|---|---|---|
| 4,264,424 | A | * | 4/1981 | Niedrach ............. G01N 27/333 204/421 |
| 4,959,138 | A | * | 9/1990 | Brinkmann ............ G01N 27/30 204/401 |
| 5,310,473 | A | * | 5/1994 | Tomita ................ G01N 27/307 204/414 |
| 5,480,534 | A | * | 1/1996 | Kato .................... G01N 27/333 204/192.1 |
| 5,607,567 | A | | 3/1997 | Yun et al. |
| 5,807,471 | A | | 9/1998 | Dror et al. |
| 5,985,117 | A | * | 11/1999 | Bachas .............. G01N 27/3335 204/413 |
| 8,961,758 | B2 | | 2/2015 | Wilke |
| 2013/0221971 | A1 | * | 8/2013 | Endl .................... G01N 27/403 324/425 |
| 2014/0144776 | A1 | | 5/2014 | Wilhelm |

FOREIGN PATENT DOCUMENTS

| | | |
|---|---|---|
| DE | 102008055084 A1 | 6/2010 |
| DE | 102010030874 A1 | 1/2012 |
| DE | 102012007854 A1 | 10/2013 |

OTHER PUBLICATIONS

Eric Bakker et al., "Polymer Membrane Ion-Selective Electrodes—What are the Limits?", IN: Electroanalysis, vol. 11, 1999, No. 13, S. 915-933.

German Search Report, German Patent Office, Munich, DE, dated Oct. 14, 2015.

Bard, Allen J. and Faulkner, Larry R., Electrochemical Methods Fundamentals and Applications, 2d. Ed., John Wiley & Sons Inc., 2001, pp. 79-80.

* cited by examiner

POTENTIOMETRIC SENSOR

TECHNICAL FIELD

The invention concerns a potentiometric sensor with a measuring half cell and a reference half cell as well as a measuring circuit that is configured for creating a measuring signal that depends on the potential difference between the measuring half cell and the reference half cell.

BACKGROUND DISCUSSION

Such sensors are often used in laboratory and process measuring technology in many areas of chemistry, biochemistry, pharmacy, biotechnology, food technology, water management and environmental technology for analysis of measuring media, in particular, measuring fluids. By means of potentiometric sensors, activities relating to chemical substances, for example, such as ions, as well as correlated measured variables such as an analyte concentration or a pH value, can be detected in measuring fluids. The substance whose activity or concentration is to be measured by the sensor is also called analyte.

Usually, potentiometric sensors comprise a measuring half cell and a reference half cell along with a measuring circuit. When in contact with the measuring fluid, the measuring half cell forms a potential that is dependent on the concentration or activity of the analyte in the measuring medium, while the reference half cell provides a stable reference potential that is not dependent on the concentration of the analyte. The measuring circuit creates a measuring signal that represents the potential difference between the measuring half cell and the reference half cell. The measuring signal may possibly be transmitted by the measuring circuit to a superordinate unit, e.g. a measuring transducer, that further processes the measuring signal.

The reference half cell of generic sensors comprises a reference element that is in contact with a reference electrolyte. The reference electrolyte is contained in a housing chamber that is formed inside the housing of the reference electrode. In order for the measurement to be performed, the reference electrolyte has to be in electrolytic contact with the measuring medium. This contact is established by means of a junction, e.g. that consists, for example, of a through hole that passes through the housing wall, a porous diaphragm or a gap. The potential of the reference half cell is defined by the reference electrolyte and the reference element. If, for example, the reference electrode is configured as a silver/silver chloride electrode, the reference electrolyte is a watery solution with a high chloride concentration and the reference element is a silver wire coated with silver chloride. The reference element is connected with the measuring circuit mentioned above in an electroconductive manner.

The measuring half cell comprises a potential-forming element, which, in the case of the measuring half cell being configured as an ion-selective electrode, can be an ion-selective membrane. Examples of such ion-selective membranes in such ion-selective electrodes are, for example, pH-sensitive glass membranes as used in common pH glass electrodes, liquid or polymer membranes, such as those used in sodium electrodes or ammonium electrodes, or a single crystal membrane such that is used for a fluoride electrode.

A measuring half cell configured as an ion-selective electrode usually comprises a housing in which a housing chamber closed off by the ion-selective membrane is formed, which contains an inner electrolyte and a conductor element that is in contact with the inner electrolyte. Often, a silver wire that is at least in sections chloride-coated is used as conductor element, especially when the reference half cell comprises a silver/silver chloride electrode. When the ion-selective membrane is brought into contact with the measuring medium, this results, due to analyte activity or concentration change, in a relative change of the balanced Galvani potential difference between the measuring fluid and the conductor element that is in contact with the membrane through the inner electrolyte. The potential difference recorded by the measuring circuit between the reference half cell that provides a constant reference potential and the conductor element of the measuring half cell changes relative to the change that occurs in the activity or concentration of the analyte in the measuring fluid.

In some applications of such potentiometric sensors in the area of process measuring technology, it is observed that the sensors often show a significantly reduced lifespan, especially in processes that involve the sensors being exposed to high temperatures and/or temperature changes, or in processes that involve the sensors being exposed to a measuring fluid or a cleaning agent that contain certain gases, e.g. hydrogen sulfide, hydrogen cyanide or ammonia. Likewise, the quality of the measured values within the lifespan is not always satisfactory.

Thus, the object of the invention is to provide a generic potentiometric sensor of the type described above, that would provide dependable measured values in such applications and have an extended service life.

SUMMARY OF THE INVENTION

The potentiometric sensor according to the invention comprises:
  a measuring half cell with a conductor element;
  a reference half cell with a reference element;
  a measuring circuit that is connected with the conductor element of the measuring half cell and with the reference element of the reference half cell, and that is designed to create a measuring signal that is dependent on a potential difference between the conductor element and the reference element, wherein the measuring half cell comprises:
  a housing, in which a housing chamber is formed, which is closed off by a first ion-selective membrane, and
  a first inner electrolyte contained within the housing chamber, contacting the ion-selective membrane, and being contacted by the conductor element,
wherein the conductor element comprises:
  an inner conductor that is connected with the measuring circuit and that, in particular, comprises a metallic conductor; and
  a gas-tight barrier that separates the inner conductor from the first inner electrolyte.

The sensor can particularly be used for recording a measured variable that is dependent on the concentration or activity of an analyte in a measuring fluid.

In case of the aforementioned applications, it has become evident that chemical processes on the conductor element of the measuring half cell in common potentiometric sensors of the prior art impair their measuring accuracy or may even lead to an early function failure.

If, for example, the measuring fluid contains not only the analyte that is to be monitored by means of the potentiometric sensor, but also other substances, which penetrate through the ion-selective membrane into the inner electrolyte of the measuring half cell and enter into chemical reactions with the conductor element, this may lead to reduced measuring quality. For example, liquid membranes and polymer membranes are permeable for gases like hydrogen sulfide, hydrogen cyanide or ammonia, which are contained in the measuring fluid. These can enter into chemical reactions with the conductor element, such as a chloride-coated silver wire used as a conductor element, wherein the chemical reactions influence the potential conduction. In the presence of sulfide ions, a chloride-coated silver wire used as conductor element will be, for example, converted into a silver/silver-sulfide electrode, which is not suitable to be used as a conductor for the measuring half cell. This may lead to a function failure of the sensor within a short period of time, possibly even within a few days. Hydrocyanic acid and ammonia that penetrate from the measuring fluid into the inner electrolyte through the membrane have a similar effect.

Additionally, silver-chloride can dissolve as a complex when the temperature rises with common potentiometric sensors known from prior art, where the conductor element is configured as a chloride-coated silver wire. With a subsequent lowering of the temperature, the dissolved silver chloride is deposited on available surfaces within the housing chamber, including the back side of the ion-selective membrane which is facing the inner side of the housing. In particular, this may increasingly occur in processes, during which the sensors are often exposed to significant temperature fluctuations. However, silver chloride deposits on the membrane are undesirable, as they can influence the potential formation on the back side of the ion-selective membrane. This is particularly to be expected, when, due to the influence of reducing substances and light, the silver chloride on the inner side of the membrane is totally or partially reduced to metallic silver.

However, the sensor according to the invention comprises a gas-tight barrier that separates the inner conductor from the first inner electrolyte. In this way, it is protected from chemical changes caused by substances that get into the housing chamber of the measuring half cell from the measured liquid via the membrane. Thus, an influence on the potential of the measuring half cell caused by such substances or an early functional failure is effectively prevented. Likewise, silver chloride deposits on the side of the first ion-selective membrane facing the inner part of the measuring half cell, caused by thermal variations are avoided.

In an advantageous embodiment, the barrier is impermeable for interfering substances, particularly gases such as hydrogen sulfide, hydrocyanic acid or ammonia, and/or interfering ions, such as sulfide, cyanide and/or ammonium ions. In a particularly advantageous embodiment, the barrier is chemically inert in relation to the interfering substances.

In one embodiment, the conductor element is configured as a membrane electrode comprising a second housing chamber that is arranged within the housing chamber and closed by a second ion-selective membrane, and a second inner electrolyte contained within the second housing chamber, whereby the inner conductor is in contact with the second inner electrolyte.

In this embodiment, the second ion-selective membrane can be a pH sensitive glass membrane or a gas-tight ion-selective solid membrane.

Preferably, both the first and the second inner electrolyte contain a buffer system, especially if the second ion-selective membrane is a pH sensitive glass membrane. The electric potential difference between the front side of the glass membrane that is facing the first inner electrolyte and the back side of the glass membrane facing the second inner electrolyte depends, according to the Nernst equation, basically on the difference between the pH values of the first and the second inner electrolyte. Therefore, it is advantageous that the pH values of both electrolytes are stabilized by a buffer system.

In a particularly advantageous embodiment, both the first and the second inner electrolytes contain an identical buffer system and have the same pH value. In this embodiment, the potential difference over the second ion-selective membrane is 0 V, if the usually very low asymmetry potential over the membrane is not taken into account.

In a further embodiment, the second inner electrolyte and the first inner electrolyte may be of the same composition. This is advantageous from a manufacturing point of view, as in this case there is no need for creating two different electrolyte solutions.

In an alternative embodiment, the conductor element can comprise an electroconductive inner conductor and a coating that serves as a barrier, shielding the electroconductive inner conductor from the inner electrolyte.

For example, the conductor element may be designed as an enamel electrode, with the coating made from enamel.

The coating that serves as a barrier can comprise at least one layer of an ion conductive polymer or an ion conductive ceramic. In particular, the ion conductive polymer may be a proton conductive polymer or a hydroxide ion conductive polymer.

In a further embodiment, the barrier coating may comprise a glass layer. This can, for example, be fused or deposited onto the inner conductor or onto a structure that surrounds the inner conductor.

Alternatively, the conductor element can comprise an electrolyte-insulator-semiconductor (EIS) structure, in particular, an ion-selective field effect transistor (ISFET). In such cases, the isolator of the EIS structure or the gate layer of the ISFET may serve as a gas-tight barrier.

The reference half cell can have a further housing chamber and a reference electrolyte that is contained in the further housing chamber that is in contact with the measuring fluid that surrounds the further housing chamber via a junction that is arranged in a wall of the further housing chamber, wherein the reference element connected with the measuring circuit is connected with the measuring circuit.

The reference element and the inner conductor can be identical in design. For example, the reference element as well as the inner conductor may comprise a silver wire that is, at least in sections, chloride-coated. The reference electrolyte and/or the second inner electrolyte can have a high chloride concentration, in particular in the form of dissolved potassium chloride with a concentration of 3 mol/l.

The first ion-selective membrane may be an ion-selective liquid membrane or a polymer membrane. These membranes, in particular, may be permeable for gases like hydrogen sulfide, ammonia or hydrocyanic acid or their ions. Due to the barrier, however, they cannot reach the inner conductor and cause chemical reactions. The first ion-selective membrane may likewise be an ion-selective solid membrane or a pH sensitive glass membrane.

In one embodiment, the sensor may be designed as a combination electrode, having a housing, in which the measuring half cell and the reference half cell are formed and thus inseparably connected to each other.

BRIEF DESCRIPTION OF THE DRAWINGS

The invention is explained in further detail below on the basis of the embodiment examples shown in the illustrations. Shown.

DETAILED DISCUSSION IN CONJUNCTION WITH THE DRAWINGS

Figure 1:
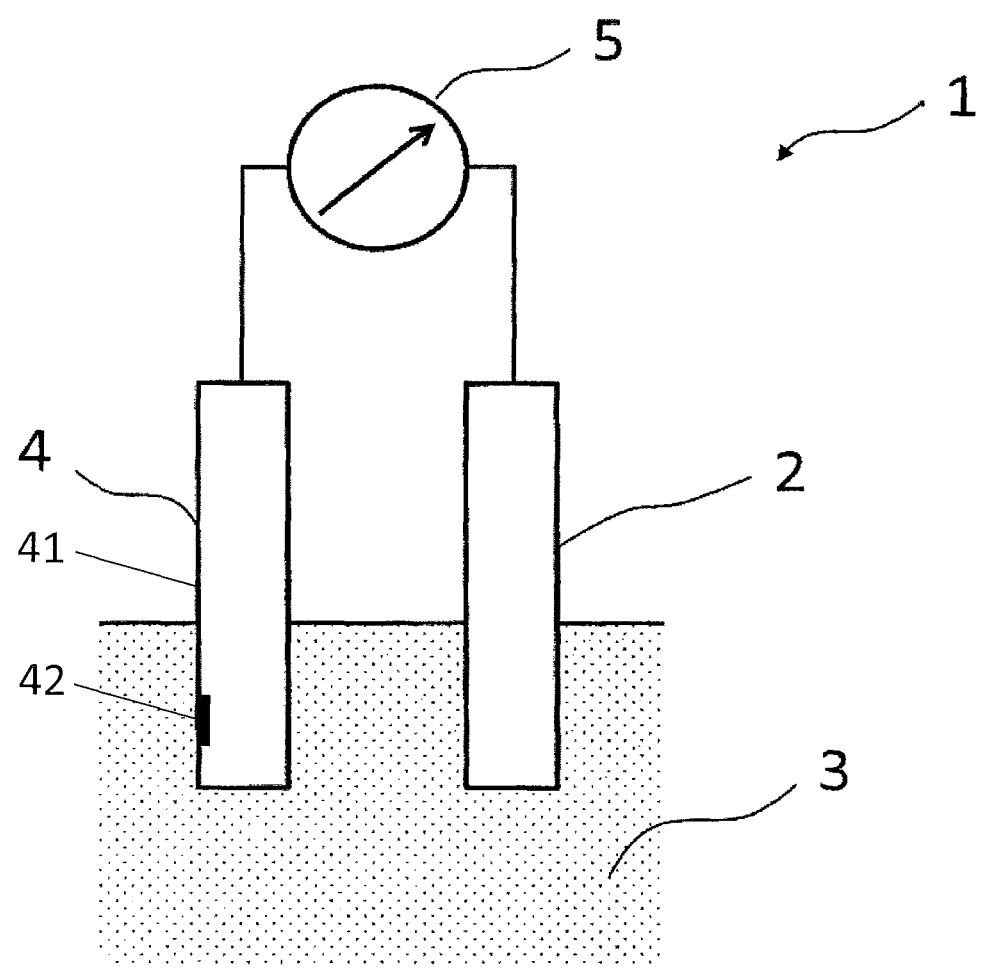
FIG. 1 is a schematic representation of a potentiometric sensor.

In FIG. 1, the structure of a potentiometric sensor 1 for measuring activity or concentration of an analyte in a measuring fluid 3 is depicted in a schematic manner. The potentiometric sensor 1 comprises a measuring half cell 2 that is at least partially immersed in the measuring fluid 3 and a reference half cell 4 that is likewise at least partially immersed in the measuring fluid 3, as well as a measuring circuit 5. The measuring circuit 5 is designed to detect, particularly in a currentless manner, a potential difference between the measuring half cell 2 and the reference half cell 4, and to create a measuring signal that represents this potential difference. Additionally, the measuring circuit 5 may be designed to further process the measuring signal, in particular, to amplify and/or digitize it, and, for example, to forward it to a superordinate unit or display equipment.

The reference half cell 4 may, for example, be designed in a way commonly known as reference electrode type II. In particular, such a reference electrode has a housing 41, in which a chamber is formed that contains a reference electrolyte. This reference electrolyte is in electrolytic contact with a medium surrounding the housing 41 via a junction 42 arranged in the housing, such as, for example, a hole, a joint or a diaphragm. The reference electrolyte is contacted by a reference element that protrudes from the back side of the reference electrode housing 41 and is connected with the measuring circuit 5. An often used electrode would be a silver/silver chloride electrode. As reference element, an at least in sections chloride-coated silver wire is used in this case. The reference electrolyte contains a high chloride concentration in this case. For example, the reference electrolyte can contain potassium chloride with a concentration of 3 mol/l.

The measuring half cell 2 may, for example, be an ion-selective electrode. In particular, the potential of the ion-selective electrode can depend on the concentration of a cation, especially $Na^+$, $K^+$, or $NH_4^+$, or of an anion, e.g. $Cl^-$, $F^-$, or $NO_3^-$. The potential of the ion-selective electrode may likewise depend on the concentration or the activity of the hydronium ion, $H^+$ or $H_3O^+$, i.e. on the pH value in the measuring fluid. Appropriate membranes that are selective for recording the desired ion are known from prior art. For measuring the pH value, e.g. an ion-selective electrode with a pH sensitive glass membrane may be used. The membrane may likewise be designed as a solid membrane, polymer membrane or liquid membrane. An ion-selective polymer membrane may, comprise, for example, a lipophilic solvent, a salt of the ion type to be measured along with a lipophilic counter-ion, and a polymeric material as a network former for stabilizing the membrane. In addition, the membrane can contain an ionophore.

Figures 2, 3:
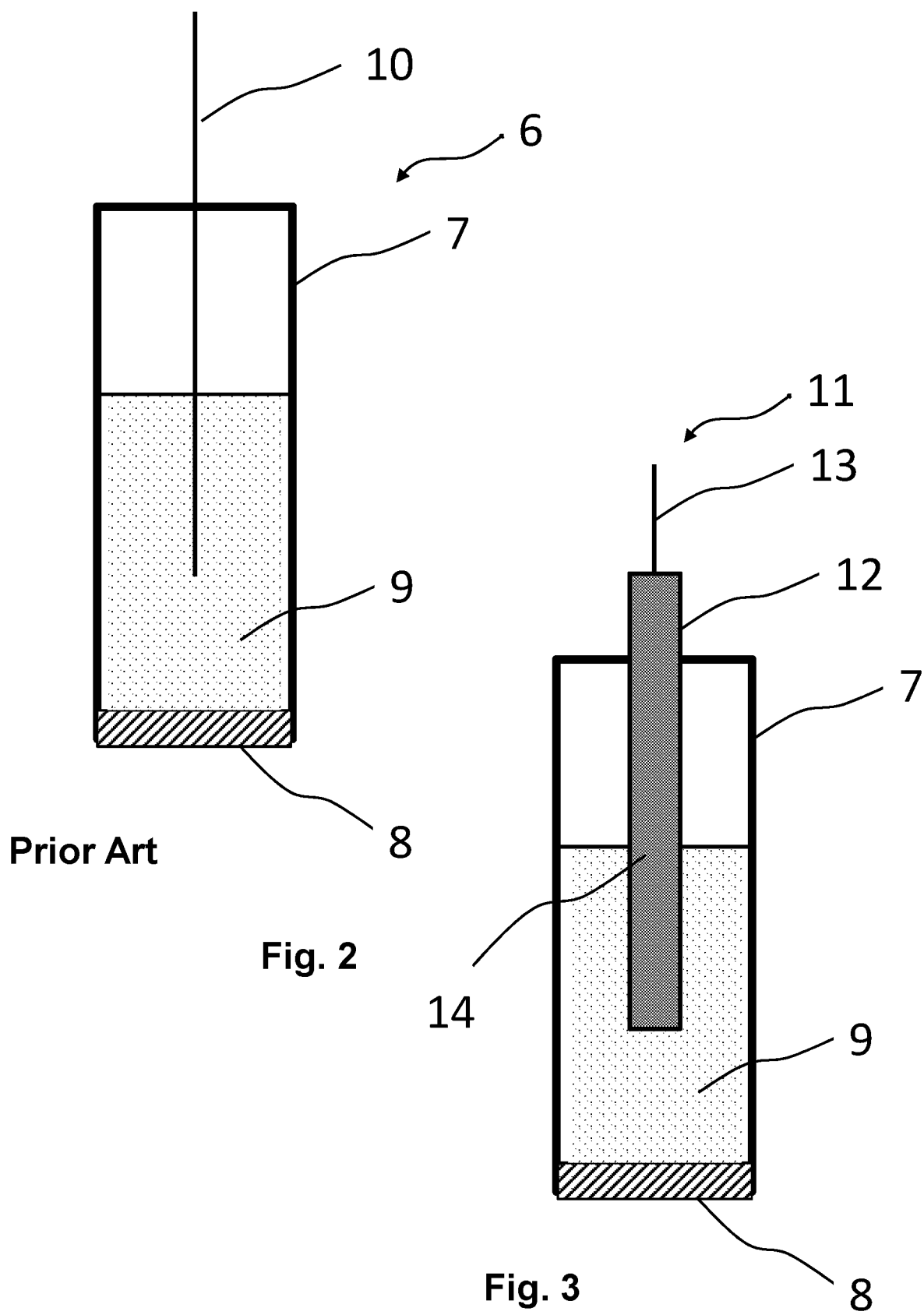
FIG. 2 is a schematic representation of an ion-selective electrode with a conductor element according to prior art.
FIG. 3 is a schematic representation of an ion-selective electrode with a conductor element that is separated from the inner electrolyte of the ion-selective electrode by a gas-tight barrier.

FIG. 2 shows a schematic representation of such an ion-selective electrode 6 according to prior art. The ion-selective electrode 6 has a cylindrical housing 7 that is closed up by the ion-selective membrane 8 on its front side. The back side of the housing 7 is closed off in a liquid-tight manner, e.g. by adhesion or amalgamation. An inner electrolyte 9 is contained inside the housing chamber formed in the housing 7, which is in contact with the back side of the ion-selective membrane 8 that faces the housing chamber. An electroconductive conductor element 10, which is connected with the measuring circuit 5, is immersed in the inner electrolyte 9. The conductor element can be identical in design to the reference element of the reference half cell 4, e.g. be an at least in sections chloride-coated silver wire. The inner electrolyte 9 can comprise, for example, similar to the reference electrolyte in the reference half cell 4, a set chloride concentration, e.g. potassium chloride in a concentration of 3 mol/l, and possibly a pH buffer system. The pH buffer system comprises at least a weak acid and its corresponding base or a weak base and its corresponding acid, and serves the purpose of stabilizing the pH value of the electrolyte.

For measuring the analyte concentration in the measuring fluid 3 by means of the potentiometric sensor 1, the reference half cell 4 and the measuring half cell 2 are immersed in the measuring fluid in such a way that the outer side of the ion-selective membrane of the measuring half cell 2 and the junction of the reference half cell 4 are completely submerged in the measuring fluid 3. In the schematic drawing shown, the measuring half cell 2 and the reference half cell 4 have two spatially separate housings. However, the sensor 1 can likewise be designed as a combination electrode in a known manner, where the housings of the measuring half cell 2 and the reference half cell 4 are firmly connected with each other.

As described above, the measurement quality as well as the service life of a potentiometric sensor with such a measuring half cell according to prior art can be impaired by substances from the measuring fluid 3 entering via the membrane 8 into the inner electrolyte 9 that trigger chemical processes on the connector element 10. Likewise, temperature fluctuations can lead to an impairment of measurement quality due to silver chloride of the conductor element 10 dissolving and later forming deposits on the back side of the membrane 8.

FIG. 3 shows an ion-selective electrode 11, where these problems are avoided. Instead of the ion-selective electrode 6 shown in FIG. 2, the ion-selective electrode 11 is inserted into the potentiometric sensor as a measuring half cell 2 of a potentiometric sensor 1, similar to the one shown in FIG. 1. The reference symbols of identical components remain the same. The ion-selective electrode 11 comprises a housing 7, which encloses a housing chamber, whose back side is sealed off in a gas-tight manner, while the front side is closed off by an ion-selective membrane 8. Inside the housing chamber, an inner electrolyte 9 is contained that is in contact with the back side of the membrane 8. The inner electrolyte in the present example is a watery solution with a set chloride concentration that may contain an additional buffer system. The conductor element 12, which protrudes out of the housing 7 and is immersed in the inner electrolyte 9, may be connected with the measuring circuit of a potentiometric sensor, similar to the sensor 1 shown schematically in FIG. 1.

The conductor element 12 comprises an inner conductor 13 that is connected with the measuring circuit 5 of the potentiometric sensor 1 and that, in particular, comprises a metallic conductor and a gas-tight barrier 14 that separates the inner conductor 13 from the inner electrolyte 9. In the present example, the conductor element 12 is designed as an enamel electrode, i.e. the gas-tight barrier 14 is formed by an enamel layer that surrounds the inner conductor 13. In the present example, the inner conductor 13 is, designed as a metal wire, e.g. a silver or platinum wire. Due to the fact that the enamel layer is shielding the inner conductor 13 from the electrolyte 9, the aforementioned chemical reactions at the conductor element that can result in declining sensor measuring quality or in an early sensor breakdown are effectively avoided.

If, for example, the ion-selective membrane 8 is a polymer membrane or a liquid membrane, through which interfering substances, in particular, gases like hydrogen sulfide, hydrocyanic acid or ammonia can enter into the inner electrolyte 9 from the measuring fluid 3, the gas-tight barrier 14 prevents a chemical attack on the inner conductor 13.

Figure 4:
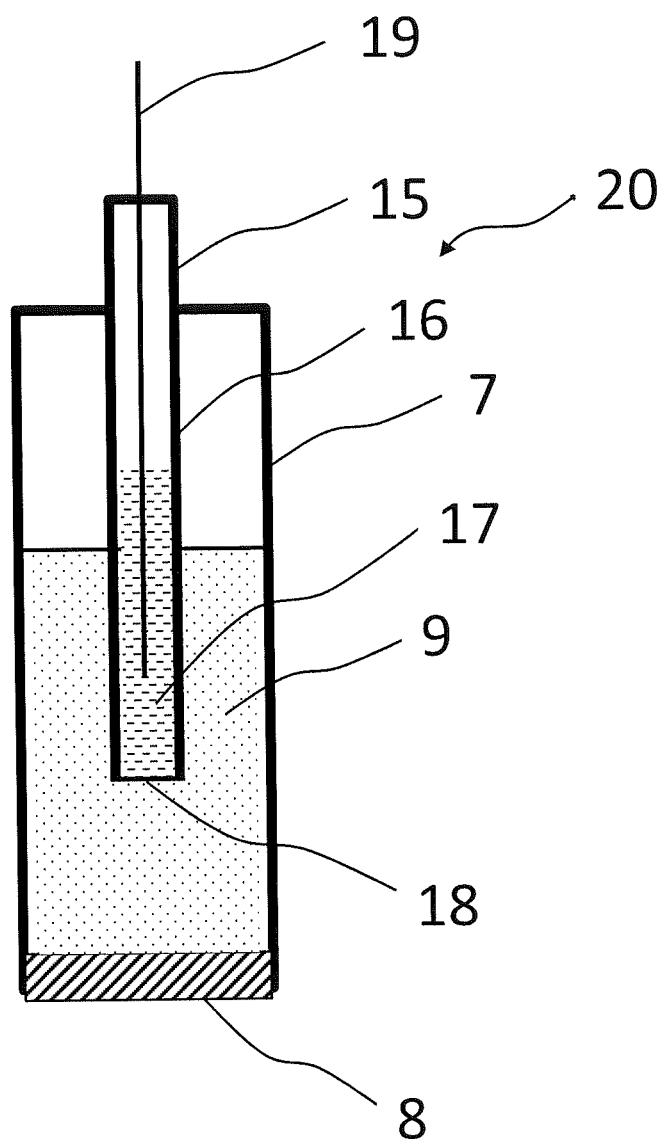
FIG. 4 is a schematic representation of an ion-selective electrode with a conductor element that is designed as a pH glass electrode.

FIG. 4 shows a second example of an ion-selective electrode 20, which serves as a measuring half cell of a potentiometric sensor, similar to sensor 1 shown in FIG. 1. In this electrode, such processes that impair the measuring quality and service life of the sensor are likewise avoided. Again, the reference symbols of identical components of the ion-selective electrodes shown in FIGS. 2 and 3 remain the same in this figure.

The ion-selective electrode 20 comprises a cylindrical housing 7 that is closed off in a liquid-tight manner on the back side. On the front side, the housing 7 is closed off by a first ion-selective membrane 8 by forming a housing chamber. Inside the housing chamber, there is a first inner electrolyte 9, which is in contact with the back side of the first ion-selective membrane 8 that faces the housing chamber. The first inner electrolyte 9 may be, for example, a watery solution containing a set chloride concentration and a buffer system.

A first conductor element 15, which can be connected with the measuring circuit 5 (FIG. 1) is immersed in the first inner electrolyte 9. The conductor element 15 comprises a housing 16 with a tube-like wall that protrudes through the back side of the housing 7 of the ion-selective electrode 14 being sealed off in a liquid-tight manner. The housing 16 can, for example, be connected to the back side of the housing 7 by means of adhesion or amalgamation. The back side of the housing 16 belonging to the conductor element 15 is likewise closed off in a liquid-tight manner, on the front side, i.e. the side that faces the first ion-selective membrane 8 of the ion-selective electrode 14, the housing 16 is closed off by a gas-tight second ion-selective membrane 18. This membrane may be a flat membrane as shown in the schematic figure. Alternatively, the second ion-selective membrane 18 may have a different geometry, e.g. a rounded form. Thus, a second housing chamber is formed to inside the housing 16 of the conductor element 15. This housing chamber contains a second inner electrolyte 17, which is in contact with the back side of the second ion-sensitive membrane 18. In this second inner electrolyte, an inner conductor 19 is immersed, which protrudes from the housing 16 of the conductor element 15 and which can be connected to the measuring circuit 5 (FIG. 1) of the potentiometric sensor 1.

The second ion-selective membrane 18 may be, for example, a solid membrane or a glass membrane. In any case, it forms a gas-tight barrier that, in particular, does not allow any substances to enter from the first inner electrolyte 9 into the second inner electrolyte 17 or vice versa.

In the present example, the second ion-selective membrane 18 is a pH sensitive glass membrane. The inner conductor 19 may be designed as an at least in sections chloride-coated silver wire. In the present example, the second inner electrolyte 17 comprises a buffer system, such as monosodium phosphate/sodium hydrogen phosphate with a concentration of 0.1 mol/l each, as well as a set chloride concentration, e.g. 3 mol/l.

In an advantageous embodiment, the first and the second inner electrolyte 9, 17 comprise similar buffer systems, preferably with a similar concentration, so that the pH value of both inner electrolytes 9, 17 are identical. Thus, the voltage over the second membrane 18 designed as pH glass membrane that is based on the difference between the pH values of the inner electrolytes is basically 0 V, except for a negligible asymmetry potential. Likewise, in case of temperature fluctuations, both inner electrolytes 9, 17 demonstrate the same behavior in this case, so that the potential difference between the front side and the back side of the pH sensitive membrane basically does not change also as a function of temperature. From a manufacturing the point of view, it is especially advantageous if both inner electrolytes are of the same composition.

In the present example, the first ion-selective membrane 8 can be a solid membrane, a glass membrane or a polymer or liquid membrane.

If the ion-selective electrode 20 is exposed to temperature fluctuations, silver chloride deposits may occur inside the housing chamber of the conductor element, as described above. However, as the second membrane 18 functions as a barrier between the second inner electrolyte 17 and the first inner electrolyte 9 of the ion-selective electrode 20, no silver chloride deposits can occur on the back side of the first ion-selective membrane 8. The potential difference over the first membrane 8 that is dependent on the analyte concentration in the measuring fluid 3 can thus not be adversely impacted by silver chloride deposits. Although silver chloride deposits may occur on the back side of the second membrane 18, which is here designed as pH sensitive membrane, they cannot adversely impact the measurement quality.

If the first ion-selective membrane 8 is a polymer membrane or a liquid membrane, through which interfering substances from the measuring fluid can enter into the first inner electrolyte 9, the inner conductor is effectively protected by the gas-tight second membrane 18 from chemical processes that could adversely impact the measurement quality.

A potentiometric sensor with an ion-selective electrode 20 as described herein can be designed like the sensor 1 described in FIG. 1. In such a case, the ion-selective electrode 20 would form the measuring half cell 2. The reference half cell of such a sensor can be a silver/silver chloride electrode with a chloride-coated silver wire as reference element, comprising a reference electrolyte that is in contact with the reference element and has a set chloride concentration, and that is in contact with the measuring fluid 3 via a junction. Furthermore, the sensor may comprise a measuring circuit that is connected with the inner conductor 19 and the reference element. The measuring circuit creates a measuring signal that is dependent on the potential difference between the inner conductor 19 and the reference element.

The invention claimed is:

1. A potentiometric sensor comprising:
   a measuring half cell with a conductor element;
   a reference half cell with a reference element; and
   a measuring circuit connected with the conductor element of the measuring half cell and the reference element of the reference half cell, the measuring circuit configured to generate a measuring signal that is dependent on a potential difference between the conductor element and the reference element, wherein the measuring half cell includes a housing in which a first housing chamber is defined, which is closed by a first ion-selective membrane, and a first inner electrolyte contained within the first housing chamber, contacting the first ion-selective membrane and being contacted by the conductor element, wherein the conductor element includes an inner conductor connected with the measuring circuit and a gas-tight barrier that separates the inner conductor from the first inner electrolyte.

2. The potentiometric sensor according to claim 1, wherein the gas-tight barrier is not permeable for interfering substances that are suitable for entering into chemical reactions with the inner conductor, including gases and/or interfering ions.

3. The potentiometric sensor according to claim 2, wherein the gas-tight barrier is chemically inert towards the interfering substances.

4. The potentiometric sensor according to claim 1, wherein the conductor element is configured as a membrane electrode including:
   the gas-tight barrier embodied as a second ion-selective membrane;
   a second housing chamber arranged within the first housing chamber and closed by the second ion-selective membrane; and
   a second inner electrolyte contained within the second housing chamber and contacting the second ion-selective membrane, wherein the inner conductor is in contact with the second inner electrolyte.

5. The potentiometric sensor according to claim 4, wherein the second ion-selective membrane is a pH sensitive glass membrane.

6. The potentiometric sensor according to claim 4, wherein the first inner electrolyte and the second inner electrolyte contain a buffer system.

7. The potentiometric sensor according to claim 4, wherein both the first inner electrolyte and the second inner electrolyte contain an identical buffer system and have the same pH value.

8. The potentiometric sensor according to claim 4, wherein the first inner electrolyte and the second inner electrolyte are of the same composition.

9. The potentiometric sensor according to claim 1, wherein the conductor element includes an electroconductive inner conductor and a coating embodied as the gas-tight barrier shielding the electroconductive inner conductor from the first inner electrolyte.

10. The potentiometric sensor according to claim 9, wherein the conductor element is embodied as an enamel electrode and the coating is formed from enamel.

11. The potentiometric sensor according to claim 9, wherein the coating embodied as the gas-tight barrier includes at least one layer of an ion conductive polymer or an ion conductive ceramic.

12. The potentiometric sensor according to claim 9, wherein the coating embodied as the gas-tight barrier includes at least one glass layer.

13. The potentiometric sensor according to claim 1, wherein the conductor element includes an ion-selective field effect transistor (ISFET).

14. The potentiometric sensor according to claim 1, wherein the reference half cell includes a reference housing chamber and a reference electrolyte contained in the reference housing chamber that is in contact with a measuring fluid that surrounds the first housing chamber via a junction arranged in a wall of the reference housing chamber.

15. The potentiometric sensor according to claim 1, wherein the reference element and the inner conductor include a silver wire that is, at least in sections, chloride-coated.

16. The potentiometric sensor according to claim 1, wherein the first ion-selective membrane is an ion-selective liquid membrane or a polymer membrane.

* * * * *